US007351964B2

(12) United States Patent
Tolmachev et al.

(10) Patent No.: US 7,351,964 B2

(45) Date of Patent: Apr. 1, 2008

(54) ION FUNNEL WITH EXTENDED MASS RANGE AND REDUCED CONDUCTANCE LIMIT APERTURE

(75) Inventors: Aleksey V. Tolmachev, Richland, WA (US); Richard D. Smith, Richland, WA (US)

(73) Assignee: Battelle Memorial Institute, Richland, WA (US)

(*) Notice: Subject to any disclaimer, the term of this patent is extended or adjusted under 35 U.S.C. 154(b) by 271 days.

(21) Appl. No.: 11/251,528

(22) Filed: Sep. 30, 2005

(65) Prior Publication Data

US 2008/0054178 A1 Mar. 6, 2008

(51) Int. Cl.
*B01D 59/44* (2006.01)
*H01J 49/00* (2006.01)

(52) U.S. Cl. ...................... 250/292; 250/281; 250/282; 250/290; 250/291; 250/396; 250/288

(58) Field of Classification Search ................ 250/281, 250/282, 290, 291, 292, 396, 288
See application file for complete search history.

(56) References Cited

U.S. PATENT DOCUMENTS 6,107,628 A 8/2000 Smith et al.
6,818,890 B1 11/2004 Smith et al.

OTHER PUBLICATIONS

Tolmachev, et al., Intern. Journal of Mass Spectrometry 203 (2000) pp. 31-47.

Shaffer, et al, Anal. Chem 1999, vol. 71, pp. 2957-2964.

Tolmachev, et al., Studies of the Ion Funnel Performance as a Function of Exit Geometries, (2 pgs).

Tang, et al., Anal. Chem, 2005 vol. 77, pp. 3330-3339.

Shaffer et al., Rapid Communications in Mass Spectrometry, vol. 11, 1997, pp. 1813-1817.

Shaffer, et al., Anal. Chem. vol. 70, 1998, pp. 4111-4119.

*Primary Examiner*—Jack Berman
*Assistant Examiner*—Meenakshi S Sahu
(74) *Attorney, Agent, or Firm*—James D. Matheson

(57) ABSTRACT

An improved ion funnel design is disclosed that decreases the axial RF (parasite) fields at the ion funnel exit. This is achieved by addition of one or more compensation electrodes after the conductance limit electrode. Various RF voltage profiles may be applied to the various electrodes minimizing the parasite axial potential wells. The smallest RF aperture that serves as the conductance limiting electrode is further reduced over standard designs. Overall, the ion funnel improves transmission ranges of both low m/z and high m/z ions, reducing RF activation of ions and decreasing the gas load to subsequent differential pumping stages.

17 Claims, 6 Drawing Sheets

ION FUNNEL WITH EXTENDED MASS RANGE AND REDUCED CONDUCTANCE LIMIT APERTURE

This invention was made with Government support under Contract DE-AC05-76RLO1830 awarded by the U.S. Department of Energy. The Government has certain rights in the invention.

FIELD OF THE INVENTION

The present invention relates generally to an apparatus and method to increase the mass-range and/or transmission efficiency of ions. The invention finds application in, e.g., analytical instruments and associated systems including, but not limited to, e.g., mass-selective instruments and components, coupled stages, and/or ionization sources and components including, but not limited to, e.g., MS, IMS/MS, FAIMS/MS, GC-MS, LC-MS, ESI-MS, and the like.

BACKGROUND OF THE INVENTION

The ion funnel has become a well established means for efficient transmission of ions in various ion sources including atmospheric pressure ionization (API) ion sources. Ions are focused by the effective potential applied to a stack of RF (e.g., ring) electrodes with gradually reducing apertures. The smallest (i.d.) aperture at the ion funnel exit, termed the conductance limit aperture, defines the gas flow exiting an ion funnel to the next stage of differential pumping. Limitations of current ion funnel configurations are well known in the art. For example, transmission of low mass ions, e.g., m/z<~100, is typically inefficient. High m/z, large molecular, ion transmission can also be inefficient due to less effective ion focusing and reduced acceptance by the next stage following the ion funnel. Exit apertures cannot be reduced below about 2 mm currently as increased penetration of the on-axis RF field (so-called "parasite RF field") along the ion funnel axis near the exit of the ion funnel deteriorates ion funnel performance, causing reduced ion transmission efficiency of both low and high m/z ions. In addition, high RF field intensities increase dissociation and fragmentation of analytes of interest as a consequence of fast ion motion and ion collisions with molecules of surrounding carrier gas. Further, operating pressure increases above about 5 Torr are also problematic since the efficiency of RF focusing is reduced, while factors leading to ion losses, including space charge expansion and drag forces from gas flows, are increased. While a DC-only conductance limit electrode installed immediately after the last RF focusing ring can slightly reduce the exit aperture i.d. and RF fields downstream from the funnel, the i.d. of the DC-only aperture still cannot be reduced without reducing transmission of desired ions.

Accordingly, alternatives to standard ion funnel designs are needed that provide suppression of parasite RF fields, increased transmission efficiencies for low and high m/z ions, reduced RF activation of ions, and smaller apertures for the conductance limit electrode thereby providing decreased gas loads to subsequent pumping stages.

SUMMARY OF THE INVENTION

The present invention relates generally to an apparatus and method for extending m/z range and transmission efficiency of ions.

In one aspect, the apparatus comprises an ion funnel having a stack of RF-DC electrodes with a conductance limiting (e.g., ring) electrode of an RF-DC type at the terminal end of the ion funnel electrodes having an exit aperture (conductance limit) reduced from standard and smaller than any electrode preceeding it in the stack of electrodes. One or more compensation electrode(s) of an RF-DC type is positioned adjacent to the conductance limiting electrode having an aperture(s) larger than the conductance limiting electrode. One or more DC-only electrode(s) is positioned adjacent to the one or more compensation electrode(s). A profile of voltages applied to the RF-DC electrodes of the funnel as well as RF-DC and/or DC-only compensation electrode(s) minimizes axial (parasite) potentials at the RF-DC electrode apertures of the funnel and of the RF-DC compensation electrode(s) thereby providing sufficiently high effective potential for ion focusing, extended m/z range, and transmission efficiency of ions through the funnel.

In another aspect, the invention is a method for extending m/z range and transmission efficiency of ions that comprises the steps of: providing an ion funnel having a stack of RF-DC electrodes in succession with an RF-DC conductance limiting electrode at the terminal end of the stack of ion funnel electrodes having an exit aperture (conductance limit) reduced from standard. The aperture is smaller than any electrode preceeding it in the stack of ion funnel electrodes; providing one or more compensation electrode(s) of an RF-DC type positioned adjacent to the conductance limiting electrode(s), wherein the compensation electrode(s) having apertures larger than the conductance limiting electrode(s); providing one or more DC-only electrode(s) positioned adjacent to the one or more compensation electrode(s); and wherein a profile of RF voltages applied to the RF-DC funnel electrodes and/or the RF-DC compensation electrode(s) minimizes axial (parasite) potentials at the apertures of the RF-DC funnel electrodes and of the RF-DC compensation electrode(s) thereby providing sufficiently high effective potential for ion focusing, extended m/z range, and transmission efficiency of ions through the funnel.

In an embodiment, the number of RF-DC electrodes in the stack of funnel electrodes is greater than about 100.

In another embodiment, the number of RF-DC electrodes in the stack of funnel electrodes is below about 100.

In another embodiment, the profile of RF voltages applied to the RF-DC electrodes is other than a uniform profile of RF voltage amplitudes applied across the RF-DC electrodes.

In another embodiment, the profile of RF voltages applied is a non-uniform profile of RF voltage amplitudes applied to the conductance limiting electrode and any of the adjacent RF-DC compensation electrodes.

In another embodiment, the non-uniform profile reduces ion activation sufficient for substantially complete transmission of ions of interest in an unfragmented state.

In another embodiment, the profile of RF voltages applied to the RF-DC electrode(s) is adjustable from about 0 to about 0.99*$V_{RF}$, where $V_{RF}$ is the RF voltage applied to the first RF-DC electrode of the ion funnel.

In another embodiment, the non-uniform profile permits operation of the ion funnel at a pressure sufficient for substantially complete transmission of all ions of interest.

In another embodiment, a high pressure generated in conjunction with a gas flow that is limited by the reduced conductance limit of the conductance limiting electrode is applied in the ion funnel in the range from about 1 Torr to about 100 Torr that yields generally inconsequential pressure increases in a downstream instrument or stage.

In another embodiment, the aperture of the RF-DC conductance limiting electrode is below about 2 mm.

In another embodiment, the aperture of the RF-DC conductance limiting electrode reduces effective gas pumping load to any subsequent pumping stage by at least a factor of 2 compared to a configuration having a conductance aperture of about 2 mm or greater.

In another embodiment, the aperture of one or more compensation electrode(s) is greater than or equal to about 2 mm.

In another embodiment, the on-axis RF electric field intensity at said conductance limiting electrode is decreased by at least about 50% and the aperture of said conductance limiting electrode is decreased by at least a factor of about 1.2 compared to a configuration having a uniform RF voltage profile and no compensation electrodes.

In another embodiment, focusing comprises a sufficiently high off-axis electric field intensity and a sufficiently low on-axis RF electric field intensity for focusing of ions suitable for any subsequent analysis stage.

In another embodiment, the exit aperture is below about 2 mm. The reduced effective aperture of the conductance limiting electrode reduces the effective gas pumping load for any subsequent pumping stage by at least a factor of about 2 compared to configurations having a conductance aperture of about 2.0 mm or greater, permitting rapid pump-down in the stage.

In another embodiment, the aperture of said RF conductance limiting electrode of said ion funnel is about 1.5 mm.

In another embodiment, the aperture of said one or more compensation electrode(s) is greater than or equal to about 2 mm.

In another embodiment, no compensation electrodes and no DC-only electrodes are positioned or used after the conductance limiting electrode.

In other embodiments, no compensation electrodes are used and one or more DC-only electrodes are used. Electrodes can be positioned adjacent to the conductance limiting electrode or elsewhere.

In other embodiments, one or more compensation electrodes are used, but no DC-only electrodes are used. Electrodes can be positioned adjacent to the conductance limiting electrode or elsewhere.

In still yet another embodiment, the conductance limiting electrode is of a DC-only type, which may be coupled with or without added compensation or DC-only electrodes described herein.

In other embodiments, the ion funnel is sequentially coupled to at least one additional apparatus for gas-phase ion separation and analysis selected from the group consisting of ion mobility spectrometry (IMS), field asymmetric waveform ion mobility spectrometry, mass spectrometry (MS), tandem MS, multiple MS stages of any kind, gas chromatography (GC), LC-MS, photoelectron spectroscopy, photodissociation spectroscopy, or combinations thereof.

In another embodiment, the ion funnel is further coupled on-line or off-line to at least one apparatus for separations and analysis of substances in solid or liquid phases selected from the group consisting of liquid chromatography (LC), normal phase LC, reversed phase LC, strong-cation exchange LC, supercritical fluid chromatography, capillary electrophoresis, capillary isoelectric focusing, gel separations in one or more dimensions, SDS-PAGE, 2-D gel, or combinations thereof.

In another embodiment, analyte ions are biological or macro-molecular ions selected from proteins, protein complexes, peptides, polypeptides, oligonucleotides, DNA, RNA, polymers, oligosaccharides, dendrimers, fragments thereof, or combinations thereof.

In other embodiments, various combinations of uniform and non-uniform profiles can be applied to electrodes associated with the ion funnel and/or the compensation electrodes. For example, in various embodiments, ion funnel electrodes can have a profile wherein the distribution of voltage amplitudes is from a high value to a low value. In other embodiments, ion funnel electrodes can have various series of uniform and non-uniform voltages, i.e., with unequal RF voltage amplitudes. Different profiles may also exist for the set of ion funnel electrodes and the set of compensation electrodes as exemplified in a uniform:non-uniform profile, where, e.g., uniform voltages (e.g., 10 V) are applied to the ion funnel electrodes and non-uniform voltages (e.g., 2 V) are applied to the compensation electrodes. In another embodiment, a uniform:uniform profile can be exemplified wherein uniform voltages (e.g., 10 V) are applied to both the ion funnel electrodes and the compensation electrodes. In still yet another example, a uniform:non-uniform:non-uniform profile is exemplified, wherein a uniform voltage (e.g., 10 V) is applied, e.g., to electrodes 1, 2, and 3, and non-uniform voltages (e.g., 8 V, 6 V, and 4 V) are applied to electrodes 4, 5, and 6, respectively, with final non-uniform voltages (e.g., 2 V) applied to the one or more compensation electrodes, respectively. No limitations are intended. All profiles and electrode voltage combinations as will be selected by those of skill in the art are within the scope of the disclosure.

TERMS

The term "conductance limit" as used herein refers to the lower aperture boundary associated with a conductance limiting electrode, e.g., the smallest (i.d.) aperture of an ion funnel. The term "conductance limiting electrode" as used herein refers to any (e.g., plate or ring) electrode of an ion funnel (whether RF or DC type) having the smallest (i.d.) aperture responsible for ultimate transmission efficiency of an ion funnel.

The term "transmission" or "transmission efficiency" as used herein refers to an ion funnel's ability to facilitate flow of charged particles and/or ions of interest to a mass analyzer or spectrometer in conjunction with, e.g., limiting flow of neutrals, e.g., of the carrier gas. The term is not limiting in that transmission of ions to any subsequent analytical stages may be facilitated in conjunction with the apparatus and methods of the invention disclosed herein.

The term "z" is the axial coordinate defining the on-axis distance from the zero ring, e.g., the conductance limiting electrode.

The term "r" is the radial coordinate defining the off-axis distance from the axis connecting centers of the electrode apertures.

The term "extended mass range" refers to enhanced transmission and transmission efficiency of the ion funnel for both low mass (m/z) and high mass (m/z) ions.

The term "compensation electrode" refers to any of a number of RF-DC and/or DC-only electrodes placed immediately following a conductance limiting electrode of the ion funnel. The geometry and potentials of compensation electrodes are chosen to deliver compensating voltage where the RF electric field increases near the center of the conductance limiting electrode.

The term "front" section used in describing RF-DC electrodes refers to electrodes located at the entry point for ions introduced to the ion funnel.

The term "rear" section used in describing RF-DC electrodes refers to electrodes of an ion funnel located near the point of exit for ions leaving the ion funnel.

The term "profile" as used herein refers to any of a number of specific distributions of voltages applied to various RF-DC electrodes of the ion funnel and/or compensation electrodes. Representative profiles include, but are not limited to, e.g., uniform profiles and non-uniform profiles. A uniform profile refers to a voltage distribution that has consistent (equal) voltage amplitude applied across a set of electrodes; amplitudes do not vary with time. A non-uniform voltage profile, in contrast, refers to voltages that can vary from electrode to electrode across a set of electrodes; amplitudes still do not vary with time.

DETAILED DESCRIPTION

An ion funnel and process are disclosed providing efficient (up to 100%) transmission of ions over a wide mass (m/z) range while limiting flow of gas through the conductance limit exit aperture permitting rapid pump-down in a subsequent stage. Ion transmission is facilitated by means of a DC field gradient applied along the ion funnel in the axial direction. Axial RF field (so-called "parasite" field) is reduced in response to the counter-balancing input from closely positioned electrodes having alternate polarities. Radial confinement is provided by RF electric fields created by alternate phase RF voltages applied to (e.g., ring) electrodes comprising the ion funnel. The balancing effect is efficient when: (i) the ring i.d. ($D_i$) is large compared to the spacing (dz) between electrode plates, (i.e., $D_i$>>dz), (ii) length of the ion funnel is large, approximating an infinite length, and (iii) the ring i.d. is the same for all rings (i.e., $D_i$=constant). The parasite axial field is further mitigated if the conductance limiting electrode is immediately followed by one or more additional RF-DC and/or DC-only electrodes with apertures larger than that of the conductance limiting electrode. In this configuration, a conductance limiting electrode with an exit aperture below about 2 mm is achievable. Electrode apertures are gradually reduced toward the funnel exit, making the ion cloud tighter and tighter as it approaches the smallest exit aperture. Further suppression of the parasite field is achieved using various voltage profiles by adjusting amplitudes of applied RF voltages such that the smaller electrode apertures have smaller RF voltages applied. Calculations have shown that applying smaller RF amplitudes to smaller RF apertures serves to suppress unwanted axial RF fields while keeping off-axis RF field intensity sufficiently high for proper ion focusing. In practice, only a few electrodes at the ion funnel exit need be adjusted. This RF voltage adjustment can be provided by a simple capacitive voltage divider.

Figure 1:
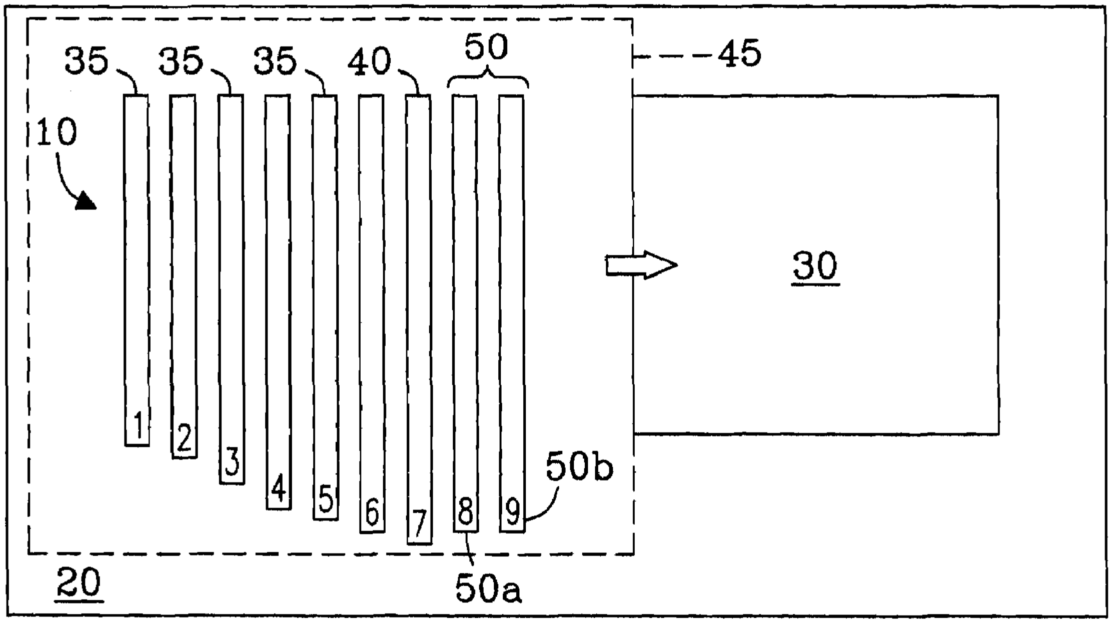
FIG. 1 is a cross-sectional view of a terminating end portion of a new ion funnel showing one or more compensation electrodes positioned immediately following the conductance limiting electrode that effectively reduces the conductance limiting aperture of the funnel, according to an embodiment of the invention.

FIG. 1 illustrates a longitudinal, cross-sectional view of a new ion funnel 10 configuration that provides for suppression of on-axis RF field intensities or "parasite" RF fields, according to an embodiment of the invention. Ion funnel 10 is an ion guide tapered to improve focusing of ions and transmission efficiency in the interface region (not shown) between any suitable ionization source 20, e.g., an Atmospheric Pressure Ionization (API) Ion Source, and any selected mass-selective instrument 30 (e.g., mass spectrometer 30), analyzer 30, or stage 30. In various embodiments, ion funnel 10 can comprise more than 100 RF electrodes 35, or alternatively can comprise fewer than 100 electrodes 35. Thus, no limitation is intended. Electrodes 35 (e.g., ring electrodes) are easily implemented, independent of the type of instrument, as they are contained solely within ionization source 20, e.g., atmospheric pressure ionization (API) source thereby eliminating need to change any elements or potentials in the mass spectrometer 30. Electrodes 35 begin to exhibit sequentially decreasing aperture diameters at about the midpoint of the stack, culminating in a conductance limiting electrode 40 positioned at the terminal end of funnel 10 having the smallest exit aperture. Funnel 10 operates in conjunction with superimposed radio frequency (RF) voltages and/or a DC gradient that functions anywhere along the length of funnel 10. Electronics that co-apply RF and DC potentials and/or gradients, including, but not limited to, e.g., a uniform ladder of DC voltages in various modes to a series of electrodes is detailed, e.g., in Smith et al. (U.S. Pat. No. 6,107,628) incorporated herein in its entirety. Other RF profiles may be implemented, as will be understood by those of skill in the art. Thus, no limitations are intended.

One or more compensation electrode(s) 50 of an RF-DC type and/or DC-type are positioned adjacent to conductance limiting electrode 40. In the instant configuration, two compensation electrodes 50 (i.e., 50*a* and 50*b*) are illustrated, electrode 50*a* of an RF-DC type and electrode 50*b* of a DC-only type. A counter-phase RF voltage applied to compensation electrode 50*a* produces a balancing effect, reducing axial RF field intensity. The one or more compensation electrode(s) 50 provides for (i) a reduced axial RF field intensity (ii) a broad m/z transmission range and transmission efficiencies for both low and high m/z ions, (iii) low RF collisional activation of ions, and, (iv) a decreased gas load in a subsequent pumping stage 30 given the smaller conductance limit aperture i.d., ~1.5 mm or less that can be utilized and/or implemented. In the instant embodiment, ion funnel 10 can operate using non-uniform voltage profiles, meaning that RF voltages applied to electrodes of funnel 10 are fully adjustable.

The effective potential ($V_{eff}$) at any point (r, z) inside the ion funnel 10 is proportional to the squared amplitude of the local RF electric field intensity ($E_{RF}$), as defined by equation (1):

$$V_{eff}(r, z) = \frac{zeE_{RF}^2(r, z)}{2m\omega^2} \quad (1)$$

where "m" and "z" are the mass and charge states of ions under consideration, respectively, "e" is the elementary charge, and $\omega=2\pi f_{RF}$ is the angular frequency corresponding to the RF frequency ($f_{RF}$). Since ($V_{eff}$) is a relative scale of potential, actual values of m/z and frequency are not essential. To facilitate interpretation of effective potential profiles, the following parameters are described herein as examples, but are not intended to be limiting: m/z=200, $f_{RF}$=550 KHz. The RF amplitude is scaled 5 times, corresponding to a voltage (peak to peak) of 100 $V_{p-p}$.

In general, the instant ion funnel 10 configuration exhibits very efficient operation. Steady state transmission is optimized, e.g., under conditions as follows: (i) Pressure in the range from about 1 to about 5 Torr, (ii) mass range of from about of 100 (m/z) to about 2500 (m/z), (iii) ion current of from about 0.1 nA to about 1 nA, and (iv) RF drive parameters of: (a) frequency of from about 0.3 MHz to about 1 MHz, and (b) voltage from about 20 V to about 400 V (peak to peak, $V_{p-p}$). As will be understood by those of skill in the art, operation parameters of ion funnel 10 may be varied depending on the analytes of interest. Parameters include, but are not limited to, e.g., frequency, amplitude, voltage, gas pressure.

The instant embodiment also provides a reduced exit aperture for the conductance limiting electrode (CLE) 40 that reduces gas flow exiting ion funnel 10. Gas flow is proportional to the area of the smallest exit aperture. Reduced gas flows translate into reduced pumping requirements in any subsequent pumping stage or device, making ion funnel 10 an acceptable device for coupling with a larger variety of mass spectrometric instruments, stages, and/or devices. The adjustable RF voltage profile allows optimization of ion funnel 10 for extending transmission of both low and high m/z ions, efficiency of transmission, suppression of ion activation, and increased operating pressures.

The MS analyzer 30 coupled in conjunction with the invention may be of any type, including but not limited to sector, quadrupole, time-of-flight (ToF), quadrupole trap, orbitrap, Fourier-transform ion cyclotron resonance (FTICR), or combinations thereof. In addition, the MS analyzer 30 can be coupled to other instruments, devices, tools, software, reagents, and/or consumables as will be understood and/or contemplated by those of skill in the art, without limitation. The extended mass range ion funnel 10 can also be sequentially coupled to one or more devices or systems for gas-phase ion separation and analysis including, but not limited to, e.g., ion mobility spectrometry (IMS), field asymmetric waveform ion mobility spectrometry, mass spectrometry (MS), tandem MS, multiple MS stages of any kind, gas chromatography (GC), LC-MS, photoelectron spectroscopy, photodissociation spectroscopy, ionization sources, ESI-MS, or combinations thereof. In other embodiments, the extended mass range ion apparatus is coupled on-line or off-line to at least one device for separations and analysis of substances in solid or liquid phases including, but not limited to, e.g., liquid chromatography (LC), normal phase LC, reversed phase LC, strong-cation exchange LC, supercritical fluid chromatography, capillary electrophoresis, capillary isoelectric focusing, gel separations in one or more dimensions, SDS-PAGE, 2-D gel, or combinations thereof.

The following examples are intended to promote a further understanding of the invention.

EXAMPLES

Example 1 describes potential distribution effects for the ion funnel 10 having a uniform RF voltage profile and one DC-only compensation electrode 50*b* adjacent to the conductance limiting electrode 40. Example 2 describes potential distribution effects and resulting transmission extension effects for the extended mass range ion funnel 10 having a non-uniform optimized RF voltage profile and two compensation electrodes, i.e., 50*a* and 50*b*.

Example 1

Potential Distribution for Ion Funnel Exit Configuration with a Uniform RF Voltage Profile and One DC-Only Compensation Electrode Potential (voltage) distributions were calculated for various ion funnel 10 exit configurations and RF voltage profiles using a potential computation software used for development of ion funnel 10, as detailed in (i) S. A. Shaffer et al. *Anal. Chem.* 71 (1999) 2957, (ii) A. V. Tolmachev et al. *International Journal of Mass Spectrometry* 203 (2000) 31-47, and (iii) J. S. Page et al. in *J. Mass Spectrom.* 2005, 40: 1215-1222. FIG. 1 illustrates an exemplary configuration for ion funnel 10 providing suppression of axial (parasite) potential at the exit aperture of the conductance limiting electrode 40, but is not intended to be limiting. In the test configuration, the rear section of the ion funnel 10 was comprised of 5 RF ring electrodes 35, including the last RF electrode 40 with a ring aperture (i.d.) of 2.5 mm, and an additional DC-only compensation electrode 50*b* with a 2 mm aperture. All electrodes were 0.5 mm thick, but are not limited thereto. A maximum RF amplitude of 10 V (zero peak) was used for convenient scaling of results, but is not limited thereto. An RF multipole 30, a next stage of differential pumping, was positioned 8 mm after DC-only (ring) compensation electrode 50*b*. The grid step used for potential calculations was 0.125 mm. In order to simulate RF potential distribution, alternate polarities were applied to RF-DC ring electrodes 35 of funnel 10. RF potential distributions assumed the DC potential gradient was applied to all ring electrodes 35. The RF voltage profile is uniform, meaning that all RF-DC ring electrodes 35 have the same RF amplitude of 10V applied. Table 1 lists axial positions, electrode 35 aperture id's, and applied RF voltages (peak-to-peak) for the configuration optimizing ion funnel 10 under tested parameters.

TABLE 1

Parameters of the exit configuration of the ion funnel having a uniform RF voltage profile and one DC-only compensation electrode.

| Electrode Number | Axial Position, z (mm) | Aperture i.d. (mm) | RF Voltage ($V_{P-P}$) |
|---|---|---|---|
| 1 | −3 | 3.5 | 10 |
| 2 | −2 | 4 | 10 |
| 3 | −1 | 3.5 | 10 |
| 4 | 0 | 3 | 10 |
| 5 | 1 | 2.5 | 10 |

TABLE 1-continued

| Parameters of the exit configuration of the ion funnel having a uniform RF voltage profile and one DC-only compensation electrode. | | | |
|---|---|---|---|
| Electrode Number | Axial Position, z (mm) | Aperture i.d. (mm) | RF Voltage ($V_{p-p}$) |
| 9 (DC-only Compensation electrode) | 2 | 2 | 0 |

Figure 2:
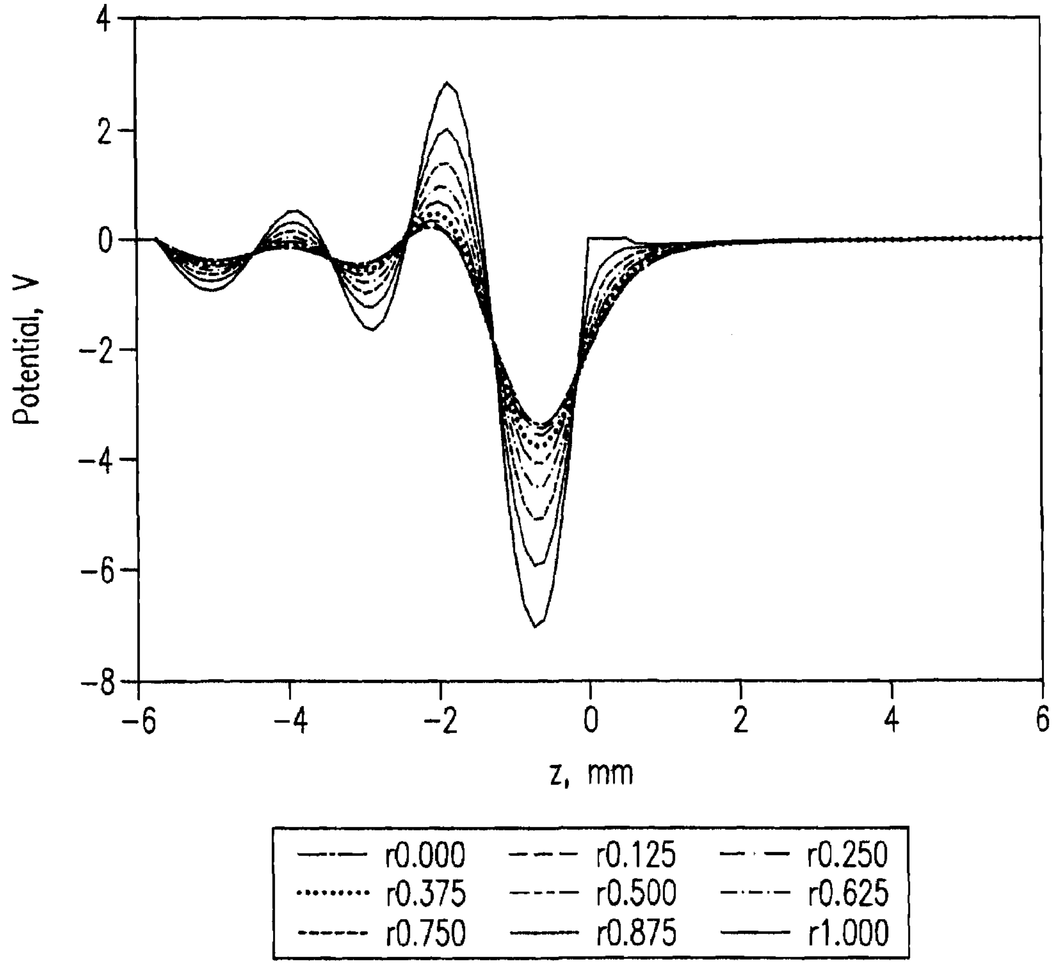
FIG. 2 is a RF potential distribution calculated for the electrode configuration illustrated in FIG. 1, for the case of a uniform RF voltage profile and one DC-only compensation electrode, Table 1.
Figure 3:
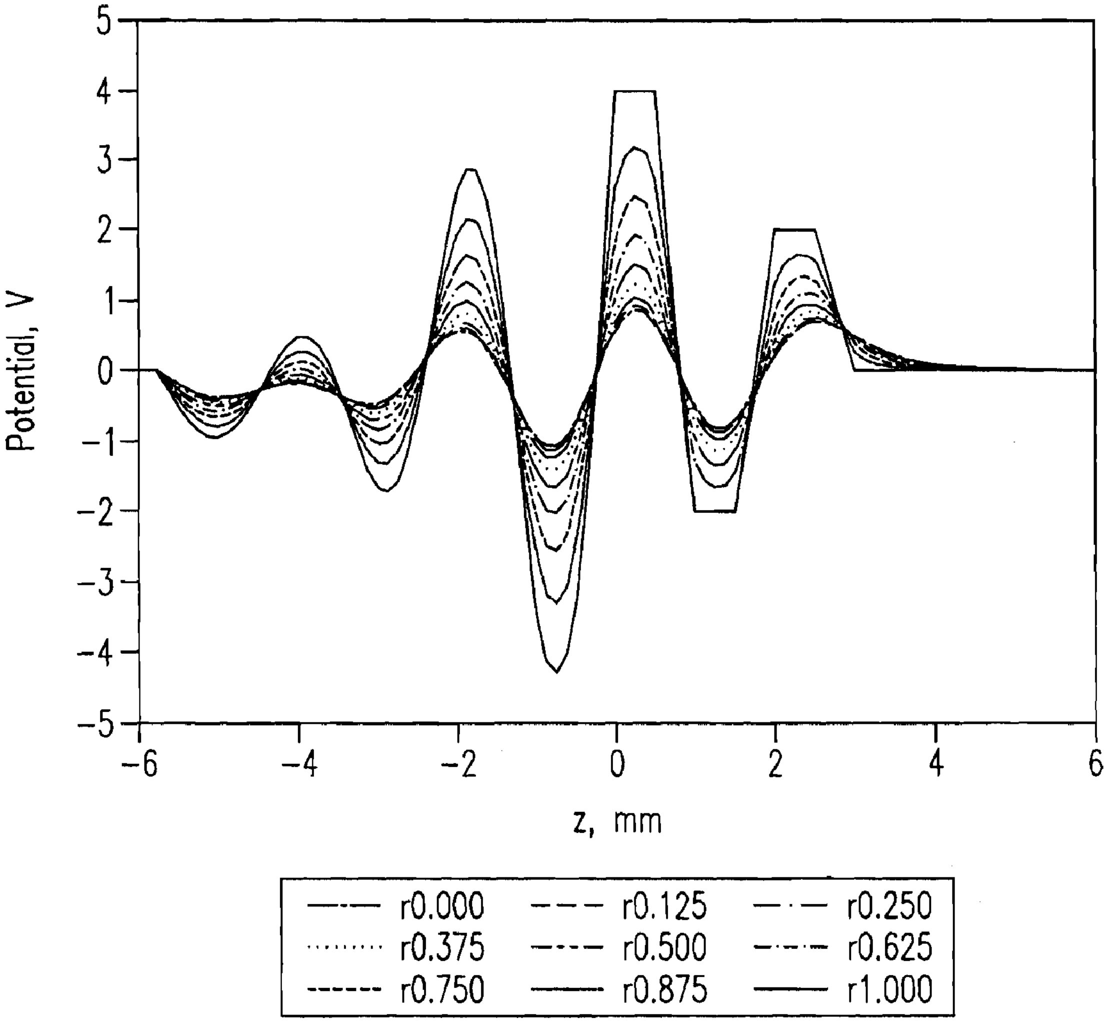
FIG. 3 is a RF potential distribution calculated for the electrode configuration illustrated in FIG. 1, for the case of an optimized non-uniform RF voltage profile and two compensation electrodes, Table 2.

Table 1 data show a uniform profile of voltages, can be applied to individual electrodes 35 of ion funnel 10 used in conjunction with one compensation electrode 50*b* of a DC-only type. FIG. 2 shows that in the instant configuration, axial, i.e. at r=0, potential oscillations reached −3V at the aperture center (r=0, z=−0.75 mm) of the last RF-DC electrode 40. FIG. 3 shows that in the instant configuration, axial, i.e. at r=0, RF electric field oscillations reached −40 V/cm at the aperture center near the front surface (r=0, z=−1.25 mm) of the last RF-DC electrode 40. The RF potential in FIG. 2 and RF electric field in FIG. 3 show an efficient attenuation at axial positions z>2 mm, i.e. after the DC-only compensation electrode 50*b*, proving the desired effect of diminishing the RF fields in regions where the fields produce no positive effect and can cause undesired perturbation of ion motion and collisional activation of ions.

Example 2

Potential Distribution and Transmission Extension Effects for Ion Funnel Exit Configuration with Optimized Non-Uniform RF Voltage Profile and Two Compensation Electrodes Example 2 details extended transmission effects observed for the ion funnel 10 configuration when an optimized non-uniform RF voltage profile is applied and additional compensation electrodes 50*a* and 50*b* are installed.

FIG. 1 illustrates an exemplary configuration for ion funnel 10 providing suppression of axial (parasite) potential at the exit aperture of the conductance limiting electrode 40, but is not intended to be limiting. In the test configuration, ion funnel 10 was comprised of 7 RF ring electrodes, including the conductance limiting electrode 40 (ring #7) with a ring aperture (i.d.) of 1.5 mm, an additional RF-DC compensation electrode 50*a* (ring #8), and an additional DC-only compensation electrode 50*b* (ring #9) both with a 2 mm aperture. All electrodes were 0.5 mm thick, but are not limited thereto. A maximum RF amplitude of 10 V (zero peak) was used for convenient scaling of results, but is not limited thereto. An RF multipole 30, a next stage of differential pumping, was positioned 8 mm after DC-only (ring) compensation electrode 50*b*. The grid step used for potential calculations was 0.125 mm. In order to simulate RF potential distribution, alternate polarities were applied to RF-DC ring electrodes 35 of funnel 10. RF potential distributions assumed the DC potential gradient was applied to all ring electrodes 35. Measurements for funnel 10 were benchmarked against the configuration with a uniform RF voltage profile, Example 1. The RF voltage profile was adjusted to minimize axial potential waves. Table 2 lists axial positions, electrode 35 aperture id's, and applied RF voltage (peak-to-peak) for the configuration optimizing ion funnel 10 under tested parameters.

TABLE 2

| Parameters of the exit configuration of the extended mass range ion funnel having non-uniform RF voltage profile and two compensation electrodes. | | | |
|---|---|---|---|
| Electrode Number | Axial Position, z (mm) | Aperture i.d. (mm) | RF Voltage ($V_{p-p}$) |
| 1 | −5 | 4.5 | 10 |
| 2 | −4 | 4 | 10 |
| 3 | −3 | 3.5 | 10 |
| 4 | −2 | 3 | 9 |
| 5 | −1 | 2.5 | 7 |
| 6 | 0 | 2 | 4 |
| 7 (Conductance Limiting electrode) | 1 | 1.5 | 2 |
| 8 (RF-DC Compensation electrode) | 2 | 2 | 2 |
| 9 (DC-only Compensation electrode) | 3 | 2 | 0 |

Figure 4:
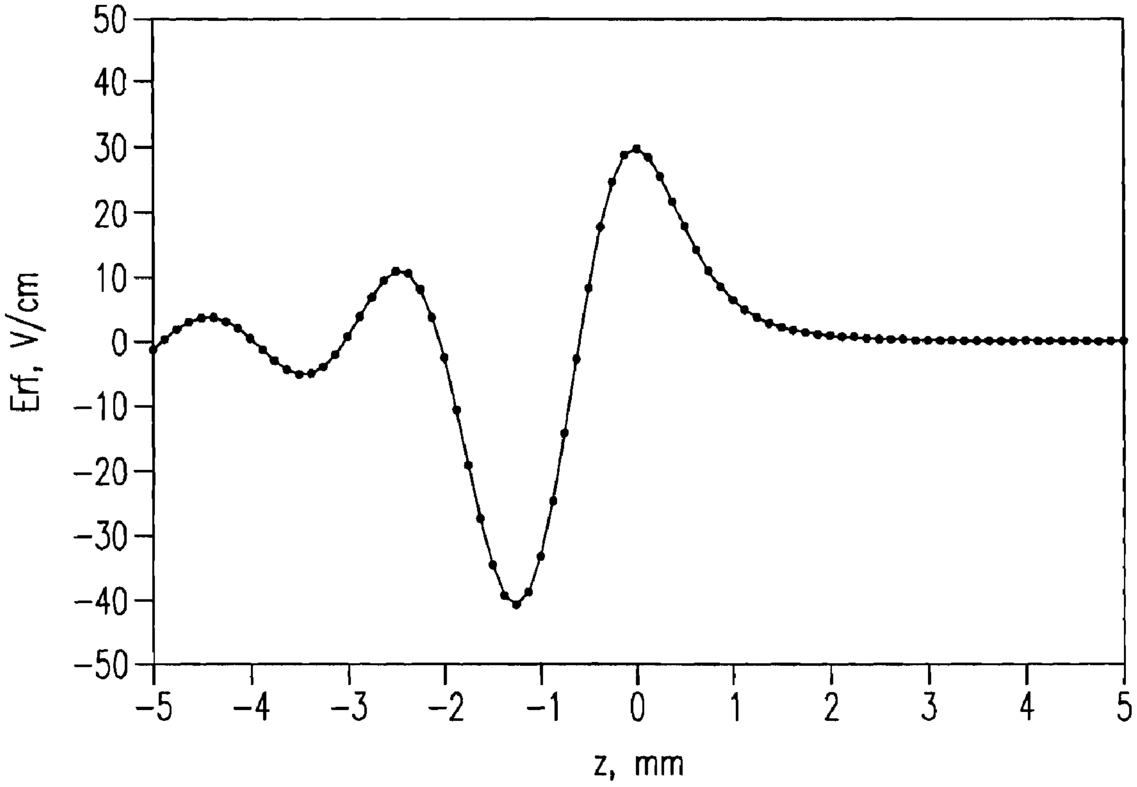
FIG. 4 shows the axial electric field amplitude $E_{RF}$ for the ion funnel configuration illustrated in FIG. 1, for the case of a uniform RF voltage profile and one DC-only compensation electrode.

Table 1 data show a non-uniform profile, or otherwise variety of voltages, can be applied to individual electrodes 35 of ion funnel 10 if used in conjunction with one or more compensation electrode(s) 50 of an RF-DC type and/or a DC-only type. In particular, the RF voltage amplitude for electrode 35 rings #7 and #8 was reduced from 10V to 2V. Voltage amplitude to electrode 35 rings #6 through ring #4 was gradually increased to a value of 10V at electrode 35 ring #3. FIG. 4 shows that in the instant configuration, axial potential oscillations were suppressed to 1V at the aperture center (r=0) of conductance limiting electrode 40 (electrode #7), a suppression of greater than 3-fold compared to Example 1.

Figure 5:
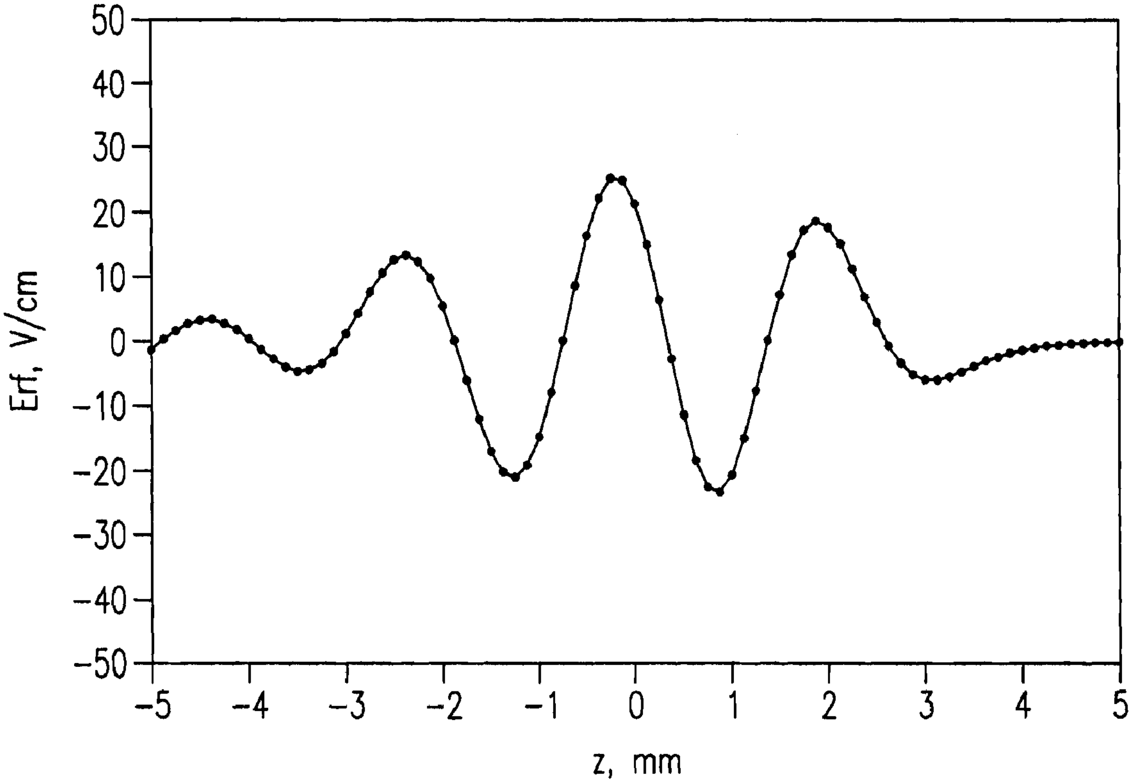
FIG. 5 shows the axial electric field amplitude $E_{RF}$ for the electrode configuration illustrated in FIG. 1, for the case of an optimized non-uniform RF voltage profile and two compensation electrodes.

FIG. 5 shows the axial RF electric field intensity for the configuration with the optimized non-uniform RF voltage profile. The maximum of absolute field intensity is reduced below 30 V/cm, or ~30% reduction compared to Example 1. The lower RF field intensity signifies lower collisional activation of ions, or an increased ability to transfer fragile ion species intact.

Results further show that the effective exit aperture of conductance limiting electrode 40 was effectively reduced to 1.5 mm, a reduction of at least about 25 percent compared to the DC-only exit aperture in Example 1. The reduction in exit aperture from about 2.0 mm to about 1.5 mm, corresponds with at least a 2-fold reduction in gas load, permitting rapid pump-down in the multipole 30, a subsequent pumping stage 30. Compensation electrodes 50*a* and 50*b* provide the counter polarity necessary to decrease the field (E) experienced by ions exiting ion funnel 10. In particular, DC-only voltage electrode 50*b* de-couples the RF field ions experience. Consequently, transmission of ions is substantially increased given that the field decreases at the exit. Further exit aperture reductions may be possible by optimization of operation parameters. Thus, no limitations are intended.

Figure 6:
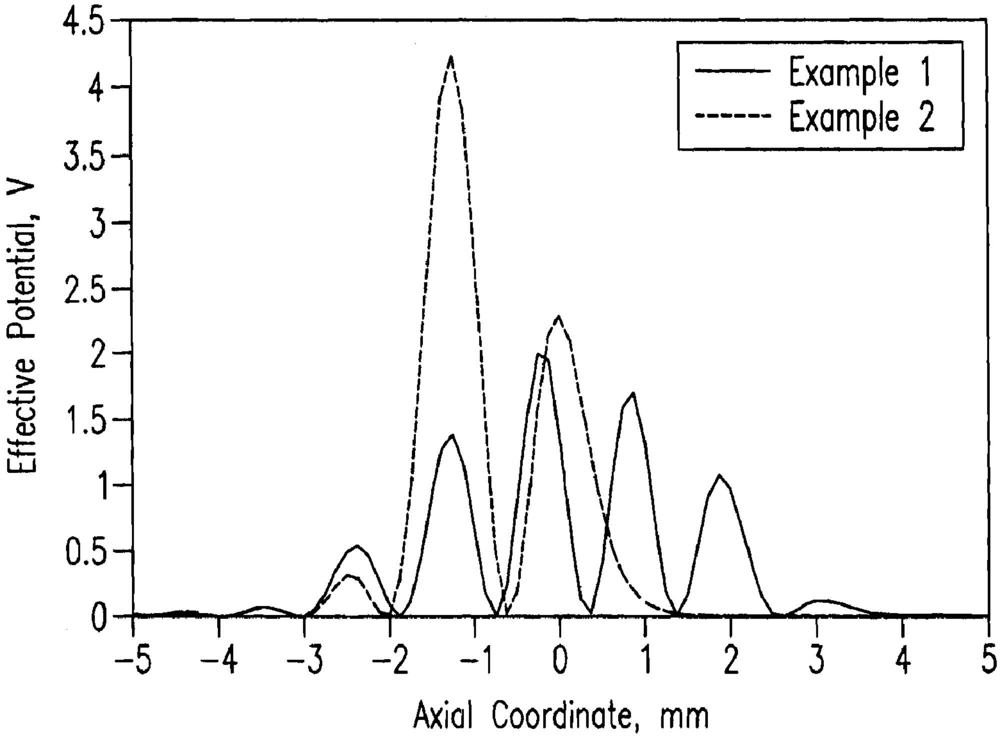
FIG. 6 presents the effective axial on-axis (r=0 mm) potential for the ion funnel electrode configuration illustrated in FIG. 1, for a uniform RF voltage profile, and for an optimized non-uniform RF voltage profile.

FIG. 6. shows axial (on-axis) effective potential profiles at a radial position r=0 mm, calculated using equation (1). The configuration Example 1 shows an intense spike of the axial effective potential, 4.2 V at z=1.25 mm, just prior to the last RF ring electrode. The configuration with the optimized non-uniform RF voltage profile and two compensation electrodes, Example 2, shows a similar spike, 2 V at z=0.25 mm. The magnitude of parasite axial effective potential well is suppressed more than 2 times. The parasite axial effective potential well has stronger influence on low m/z ions, since the effective potential is inversely proportional to m/z, according to equation (1). This proves an improved low m/z transmission efficiency for the ion funnel configuration Example 2.

Figure 7:
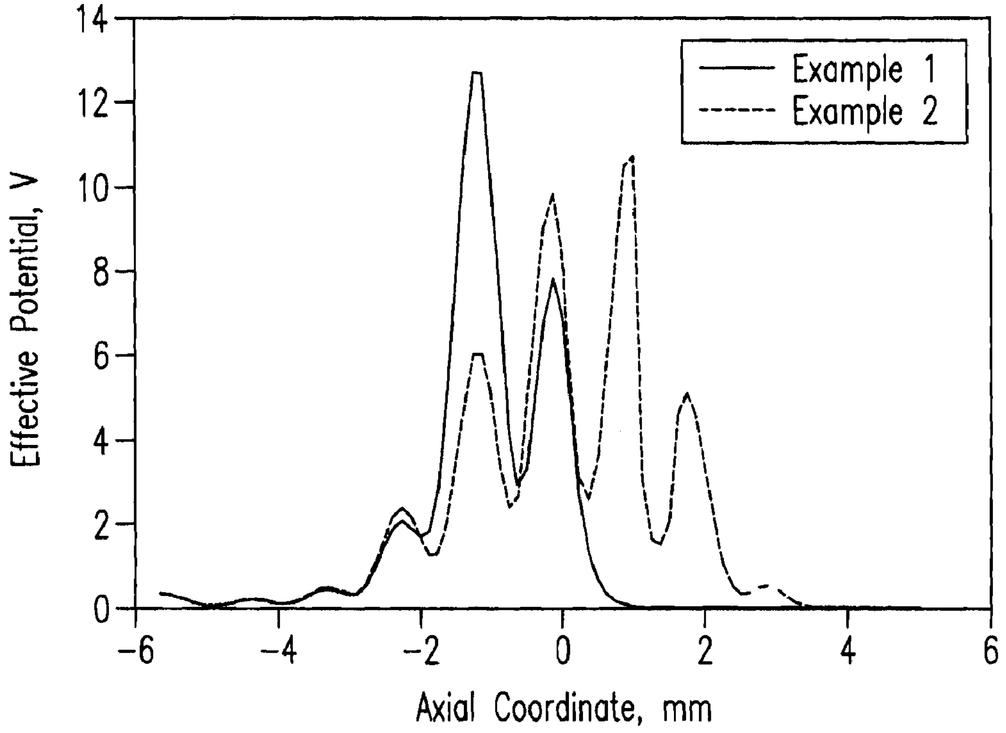
FIG. 7 presents the effective off-axis (r=0.6 mm) potential profiles for the ion funnel electrode configuration illustrated in FIG. 1, for a uniform RF voltage profile and for an optimized non-uniform RF voltage profile.

FIG. 7. shows the effective potential profiles at a radial position r=0.6 mm, calculated using equation (1). The effective potential at the conductance limit position, z=0, for a configuration in Example 1 is $V_{eff}$=8V. The modified configuration has a conductance limit at z=1 mm, corresponding to $V_{eff}$=11V, providing a more intense and effective ion focusing at ultimately smaller radii. The tighter focusing improves ion acceptance by the RF multipole stage 30 installed downstream from ion funnel 10 and would be expected to exhibit better transmission of high m/z ions. Increased transmission efficiency is achieved in spite of the lower RF voltages applied to the conductance limiting electrode 40, and compensation electrodes 50*a* and 50*b*. This apparent contradiction in the instant configuration may be explained by (i) the introduction of an RF conductance limit electrode 40 rather than use of a DC-only conductance limit electrode, and (ii) introduction of compensation electrode 50*a* (ring #8), which further increases the off-axis effective potential at the conductance limit electrode 40 (ring #7). No limitations are intended. In practice, further analyses could also investigate effective field intensity (E) calculations, ion stability considerations, and direct simulations of ion transmission.

FIG. 7 further shows effective off-axis potential profiles at a radial position of r=0.6 mm for the instant ion funnel 10 configuration. The radial position of z=0.6 mm represents radial offsets approaching the radius 0.75 mm of conductance limit aperture of the configuration Example 2. The effective potential at the conductance limit position, z=0, for the configuration Example 1 is $V_{eff}$=8V. The configuration Example 2 has the conductance limit at z=1 mm, corresponding to $V_{eff}$=11V. Thus the configuration in Example 2 has an advantage of more intense effective ion focusing at smaller radii. The tighter focusing improves ion acceptance by the RF multipole 30 which is installed downstream from ion funnel 10. This proves that the configuration of Example 2 has a property of improved transmission of high m/z ions. This is achieved in spite of the lower RF voltage applied to the exit rings. This apparent contradiction is explained as follows. First, the Example 1 configuration has a DC-only conductance limit, compared to the smaller, RF-connected conductance limit configuration of Example 2. Secondly, additional compensation electrode (ring #8) 50*a* in configuration 2 serves to further increase the off-axis effective potential at the conductance limiting electrode (ring #7) 40.

CONCLUSIONS

Ion funnel modifications described herein can improve all major ion funnel characteristics. For example, mass range can be extended for both low and high m/z ions. The ion funnel described herein operates with a reduced axial RF electric field intensity, resulting in reduced RF collisional ion activation, as well as reduced ion dissociation. The conductance limiting electrode aperture reduced more than about 25% below 2 mm corresponds to more than ~2-fold reduction of gas flow to any subsequent stage of differential pumping. Modifications described herein can be further optimized for a particular purpose, e.g. further reduced conductance limit i.d., improved high or low m/z transmission. Optimization can be achieved as described above, using the combination of RF compensation electrodes installed immediately following the smallest RF aperture electrode and a tailored profile of RF voltages applied to the exit ring electrodes and/or compensation electrodes. All modifications as will be selected by those of skill in the art are hereby incorporated.

While the present disclosure is exemplified by specific embodiments, it should be understood that the invention is not limited thereto, and variations in form and detail may be made without departing from the spirit and scope of the invention. All such modifications as will be envisioned by those of skill in the art are hereby incorporated.

We claim:

1. A modified ion funnel that extends the m/z range and the efficiency of transmission of ions in mass spectrometry analysis, comprising:

an ion funnel having one or more electrodes disposed in succession with a terminal electrode disposed immediately following said one or more electrodes with co-axially aligned apertures, said terminal electrode having an aperture smaller than any electrode preceding it in said ion funnel;

a conductance limiting electrode co-axially aligned with, and disposed immediately following, said terminal electrode of said ion funnel, said conductance limiting electrode defining an aperture that is smaller than any other aperture of said ion funnel;

at least one compensation electrode co-axially aligned with, and disposed immediately following, said conductance limiting electrode, said at least one compensation electrode defining an aperture that is larger than the aperture of said conductance limiting electrode, wherein said at least one compensation electrode generates an electric potential adapted to deliver preselected on-axis and off-axis potential distributions at apertures of said one or more electrodes, said terminal electrode, said conductance limiting electrode, and/or said at least one compensation electrode; and whereby said preselected potential distributions extend the m/z range, the operational pressure range, and/or the efficiency of transmission of ions to a subsequent differential pumping stage or to a mass spectrometer.

2. The modified ion funnel of claim 1, further comprising a voltage source operably connected to said modified ion funnel that applies a non-uniform profile of preselected RF and/or DC voltages to said one or more electrodes, said terminal electrode, said conductance limiting electrode, and/or said at least one compensation electrode.

3. The modified ion funnel of claim 2, wherein said aperture of said conductance limiting electrode defines a reduced gas flow to said subsequent differential pumping stage and/or to said mass spectrometer.

4. The modified ion funnel of claim 1, wherein the extended pressure range includes pressures in the range from about 1 Torr to about 100 Torr.

5. The modified ion funnel of claim 2, wherein said at least one compensation electrode and said profile of non-uniform voltages decrease the on-axis maximum of the effective potential at said aperture of said conductance limiting electrode by at least a factor of 2, and increase the magnitude of the effective off-axis potential at the corresponding axial position of same compared to an ion funnel configuration having no compensation electrodes and a uniform voltage profile.

6. The modified ion funnel of claim 2, wherein said non-uniform profile of RF voltages reduces ion activation sufficient for complete transmission of ions in an unfragmented state to a subsequent analytical stage.

7. The modified ion funnel of claim 2, wherein said non-uniform profile of voltages increases the range of high m/z ions transmitted to a subsequent analytical stage by at least about 60 percent as compared to an ion funnel configuration having no compensation electrodes and a uniform profile of voltages.

8. The modified ion funnel of claim 2, wherein said non-uniform profile of voltages increases the range of low m/z ions transmitted to a subsequent analytical stage by at least about 25 percent as compared to an ion funnel configuration having no compensation electrodes and a uniform profile of voltages.

9. The modified ion funnel of claim 1, wherein said conductance limiting electrode has an aperture below about 1.5 mm.

10. The modified ion funnel of claim 9, wherein said aperture of said conductance limiting electrode reduces effective gas pumping load to any subsequent pumping stage by at least a factor of 2 compared to a configuration having a terminal electrode aperture of 2.0 mm or greater.

11. The modified ion funnel of claim 2, wherein said at least one compensation electrode has an aperture greater than or equal to about 2 mm.

12. The modified ion funnel of claim 2, wherein said conductance limiting electrode provides a maximum absolute on-axis RF electric field intensity that is at least about 40% below that of an ion funnel configuration having no compensation electrodes and a uniform voltage profile.

13. The modified ion funnel of claim 1, wherein the number of compensation electrodes is 2.

14. The modified ion funnel of claim 1, further comprising at least one DC-only electrode co-axially aligned with, and disposed immediately following, said at least one compensation electrode.

15. The modified ion funnel of claim 2, wherein said non-uniform profile includes voltages that range from a preselected maximum voltage of about $0.99*V_{RF}$ to a preselected minimum voltage of about 0 volts.

16. The modified ion funnel of claim 15, wherein said preselected maximum and said preselected minimum voltages are about 100 V (p-p) and about 0 volts (p-p), respectively.

17. The modified ion funnel of claim 2, wherein said non-uniform profile of RF voltages includes RF voltages that differ in magnitude between electrodes of said ion funnel and said conductance limiting electrode, and/or between said at least one compensation electrodes.

* * * * *